United States Patent
Yoon et al.

(10) Patent No.: US 9,578,249 B2
(45) Date of Patent: *Feb. 21, 2017

(54) APPARATUS AND METHOD FOR IMAGE CAPTURE USING IMAGE STORED IN CAMERA

(71) Applicant: Samsung Electronics Co., Ltd., Gyeonggi-do (KR)

(72) Inventors: Young-Kwon Yoon, Seoul (KR); Seung-Woo Lee, Gyeonggi-do (KR); Jae-Hyun Park, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/875,078

(22) Filed: Oct. 5, 2015

(65) Prior Publication Data

US 2016/0028963 A1 Jan. 28, 2016

Related U.S. Application Data

(63) Continuation of application No. 12/580,775, filed on Oct. 16, 2009, now Pat. No. 9,154,700.

(51) Int. Cl.
*H04N 5/232* (2006.01)
*H04N 1/00* (2006.01)
(Continued)

(52) U.S. Cl.
CPC ......... *H04N 5/23293* (2013.01); *G06T 1/0007* (2013.01); *H04N 1/0044* (2013.01); *H04N 1/2137* (2013.01); *H04N 1/2145* (2013.01); *H04N 5/2356* (2013.01); *H04N 5/23222* (2013.01); *H04N 2101/00* (2013.01)

(58) Field of Classification Search
CPC ............ H04N 5/23293; H04N 5/23222; H04N 1/2137; H04N 1/0044; H04N 5/2356; H04N 2101/00; H04N 1/2145; G06T 1/0007
See application file for complete search history.

(56) References Cited

U.S. PATENT DOCUMENTS 5,367,332 A 11/1994 Kerns et al.
6,262,769 B1 7/2001 Anderson et al.
(Continued)

FOREIGN PATENT DOCUMENTS

EP 0 984 614 3/2000
KR 1020060055871 5/2006
(Continued)

*Primary Examiner* — Jason Flohre
(74) *Attorney, Agent, or Firm* — The Farrell Law Firm, P.C.

(57) ABSTRACT

An apparatus and a method thereof are provided, the apparatus including a first memory; a second memory; an image sensor; and a controller configured to obtain, using the image sensor, a plurality of images including a first image and a second image corresponding to at least one object in a first resolution, each of the first image and the second image corresponding to a different time from each other; store, in the first memory, the first image at least temporarily; display, via a display operatively coupled with the controller, the second image in a second resolution; and store, in the second memory, the first image stored in the first memory, in response to an input received in relation with the second image as displayed via the display.

20 Claims, 5 Drawing Sheets

(51) Int. Cl.
*H04N 1/21* (2006.01)
*H04N 5/235* (2006.01)
*G06T 1/00* (2006.01)
*H04N 101/00* (2006.01)

(56) References Cited

U.S. PATENT DOCUMENTS

| | | | |
|---|---|---|---|
| 6,734,910 | B1 | 5/2004 | Yumoto et al. |
| 7,408,574 | B2 | 8/2008 | Miyazaki |
| 7,471,318 | B2 | 12/2008 | Butterworth |
| 2003/0189647 | A1 | 10/2003 | Kang |
| 2004/0070679 | A1 | 4/2004 | Pope |
| 2005/0001908 | A1 | 1/2005 | Lee |
| 2005/0078197 | A1 | 4/2005 | Gonzalez |
| 2005/0151870 | A1 | 7/2005 | Yokonuma |
| 2006/0012699 | A1* | 1/2006 | Miki ............... H04N 5/23248 348/333.01 |
| 2006/0061670 | A1 | 3/2006 | Butterworth |
| 2006/0197849 | A1* | 9/2006 | Wernersson ........... H04N 5/232 348/231.99 |
| 2006/0268124 | A1 | 11/2006 | Fishman et al. |
| 2007/0270182 | A1 | 11/2007 | Gulliksson et al. |
| 2008/0079817 | A1 | 4/2008 | Murata et al. |
| 2008/0136940 | A1 | 6/2008 | Srikanth et al. |
| 2008/0136942 | A1* | 6/2008 | Yoon ................... H04N 5/23293 348/231.99 |
| 2008/0198243 | A1 | 8/2008 | Kijima |
| 2008/0284866 | A1 | 11/2008 | Mizutani |
| 2009/0231448 | A1* | 9/2009 | Yuyama ............. H04N 5/23248 348/208.4 |

FOREIGN PATENT DOCUMENTS

| | | |
|---|---|---|
| KR | 1020060120173 | 11/2006 |
| KR | 100871222 | 12/2008 |
| KR | 1020090070051 | 7/2009 |
| WO | WO 2006/092218 | 9/2006 |

\* cited by examiner

APPARATUS AND METHOD FOR IMAGE CAPTURE USING IMAGE STORED IN CAMERA

PRIORITY

This application is a Continuation application of U.S. patent application Ser. No. 12/580,775, which was filed in the U.S. Patent and Trademark Office on Oct. 16, 2009, the entire content of which is incorporated herein by reference.

BACKGROUND OF THE INVENTION

1. Field of the Invention

The present invention relates generally to capturing a still image using images stored separately at predetermined times in addition to a preview image and, more particularly, to an apparatus and method for storing high-resolution images received at predetermined times in a first buffer and capturing a still image using the high-resolution images stored in the first buffer.

2. Description of the Related Art

An ordinary digital camera includes a lens system for forming an image of a subject on a film or a surface of an image sensor, and the image sensor for detecting the image formed by the lens system as an electrical signal. The film or the surface of the image sensor corresponds to an image surface of the lens system. A focus of the lens system varies in position according to a distance between the lens and the subject. Therefore, it is possible to capture or photograph images of various qualities according to changes in the position of the image surface, which is associated with a position of the subject.

A user photographs a desired subject in an image using a digital camera with the above-stated elements. In order to more easily take a picture of a desired subject, the user may use a preview image that provides an image of the subject in real time, to previously get hold of the image to be captured. The preview image is displayed on a display through the lens system in real time, and the user may easily take a picture of the desired subject while viewing the displayed preview image. A camera with the function of outputting a preview image on the display is the necessaries of life, playing an important role in multimedia communication required in the modern society.

An internal structure of a common camera outputting a preview image will be described with reference to FIG. 1 below.

Figure 1:
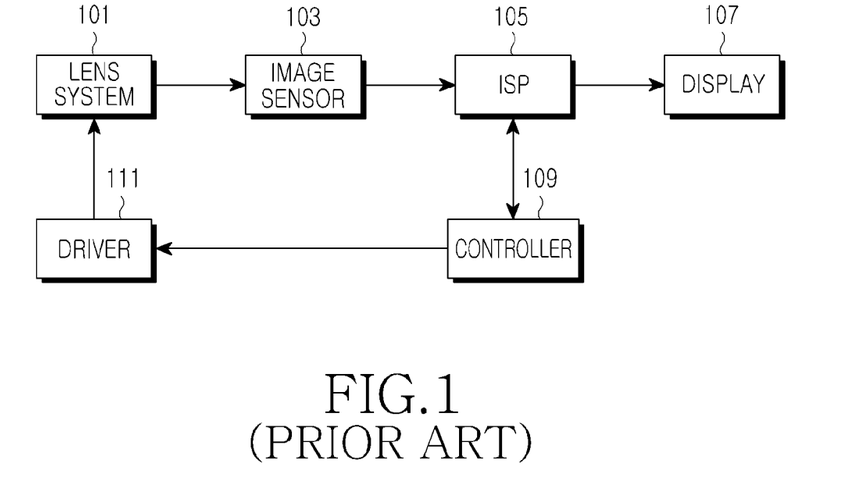
FIG. 1 is a diagram showing an internal structure of a conventional camera outputting a preview image.

FIG. 1 shows an internal structure of a conventional camera outputting a preview image. Elements of the camera include a lens system 101, an image sensor 103, a driver 111, an Image Signal Processor (ISP) 105, a display 107, and a controller 109.

Referring to FIG. 1, the lens system 101 optically receives an image of a subject, and includes at least one lens. The image sensor 103 converts the image of a subject optically received by the lens system 101 into an electrical signal. The ISP 105 processes the electrical signal received from the image sensor 103 on a frame-by-frame basis, and outputs a low-resolution image frame that is converted according to screen features (size, picture quality, resolution, etc.) of the display 107.

The display 107 displays the low-resolution image frame received from the ISP 105 on a screen, and the driver 111 moves the lens system 101 according to control of the controller 109. Although not shown in the drawing, the driver 111 includes a motor for providing a driving force, and a carrier for moving the lens system 101 forward and backward by the driving force. The controller 109 controls the driver 111 to move the lens system 101 to a focal position.

Now, a description will be made of a procedure for receiving and analyzing a preview image using the elements in FIG. 1, When an image of a subject is optically received through the lens system 101, the image sensor 103 converts the optically received image of a subject into an electrical signal and provides the electrical signal to the ISP 105. The image of a subject received through the lens system 101 is continuously received in real time, and the image sensor 103 converts the received real-time image of a subject into an electrical signal, and provides the electrical signal to the ISP 105. The ISP 105 converts the received real-time image of a subject into a low-resolution preview image and displays the low-resolution preview image on the display 107. The user may monitor the received real-time preview image on the display 107.

Commonly, however, when a user captures an image while viewing a preview image, an image following the preview image is captured. If the subject is stationary, it doesn't matter even though an image is captured after the time the user intends to take a picture of the subject. However, in case of an image sensitive to motion, an unwanted image may be captured after the time the user intends to take a picture.

SUMMARY OF THE INVENTION

An aspect of the present invention provides an apparatus and method for reading an image stored in a first buffer as a captured image and displaying the captured image on a display, when a user inputs an image capturing signal independently of a preview image being displayed on the display.

In accordance with an aspect of the present invention, an apparatus is provided. The apparatus includes a first memory; a second memory; an image sensor; and a controller configured to obtain, using the image sensor, a plurality of images including a first image and a second image corresponding to at least one object in a first resolution, each of the first image and the second image corresponding to a different time from each other; store, in the first memory, the first image at least temporarily; display, via a display operatively coupled with the controller, the second image in a second resolution; and store, in the second memory, the first image stored in the first memory, in response to an input received in relation with the second image as displayed via the display.

In accordance with another aspect of the present invention, a method is provided. The method includes obtaining, at an electronic device including an image sensor and first memory, a plurality of images including a first image and a second image corresponding to at least one object in a first resolution using the image sensor, each of the first image and the second image corresponding to a different time from each other; storing, in the first memory, the first image at least temporarily; displaying, via a display operatively coupled with the electronic device, the second image in a second resolution; and storing, in second memory operatively coupled with the electronic device, the first image stored in the first memory, in response to an input to capture an image.

In accordance with another aspect of the present invention, a machine-readable storage device storing instructions that, when executed by at least one processor, cause the at least one processor to perform operations is provided. The operations include obtaining, at an electronic device including an image sensor and first memory, a plurality of images including a first image and a second image corresponding to at least one object in a first resolution using the image sensor, each of the first image and the second image corresponding to a different time from each other; storing, in the first memory, the first image at least temporarily based at least part on a determination that the first image corresponds to a specified period of time; displaying, via a display operatively coupled with the electronic device, the second image in a second resolution; and storing, in second memory operatively coupled with the electronic device, the first image stored in the first memory, in response to an input to capture an image.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Reference will now be made in detail to exemplary embodiments of the present invention with reference to the accompanying drawings. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 2:
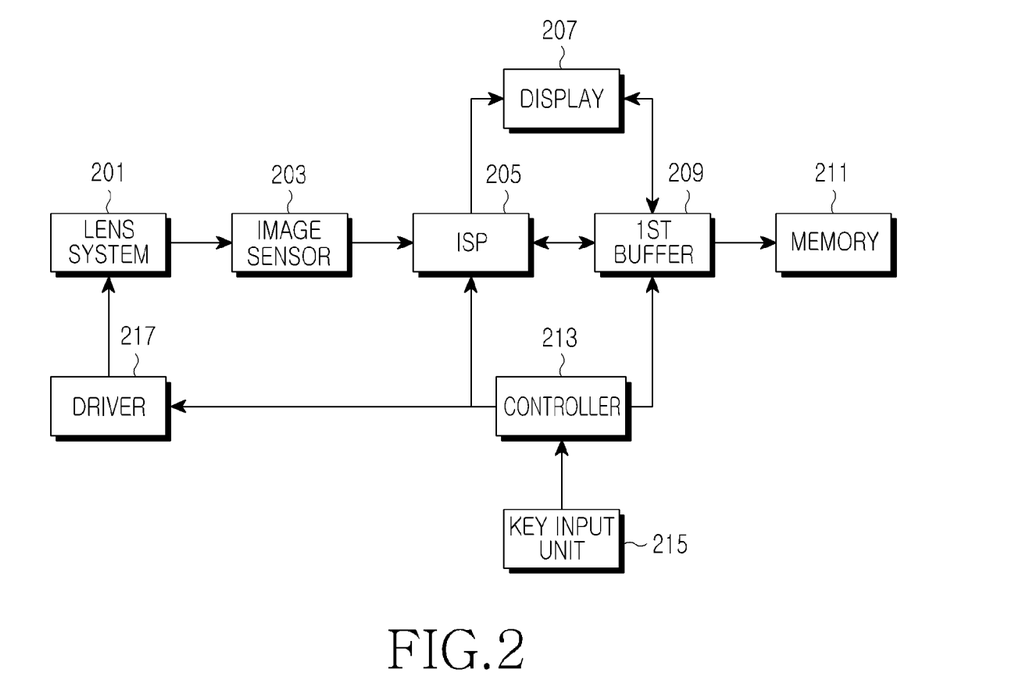
FIG. 2 is a diagram showing an internal structure of a camera using an image stored in a buffer according to an embodiment of the present invention.

FIG. 2 shows an internal structure of a camera using an image stored in a buffer according to an embodiment of the present invention. The camera shown in FIG. 2 includes a lens system 201, an image sensor 203, an Image Signal Processor (ISP) 205, a display 207, a first buffer 209, a memory 211, a controller 213, a key input unit 215, and a driver 217.

Referring to FIG. 2, the lens system 201 optically receives an image of a subject, and includes at least one lens. The image sensor 203 converts the image of a subject optically received by the lens system 201 into an electrical signal. The ISP 205 processes the electrical signal received from the image sensor 203 on a frame-by-frame basis, and outputs a preview image that is converted into a low-resolution image according to screen features (size, picture quality, resolution, etc.) of the display 207. The ISP 205 generates high-resolution images at predetermined periods and provides the high-resolution images to the first buffer 209. That is, the ISP 205 generates an image corresponding to a predetermined period among received images, as a high-resolution image, and temporarily stores the high-resolution image in the first buffer 209. The low-resolution preview image displayed on the display 207 in real time and the high-resolution image stored in the first buffer 209 may vary in size, picture quality and resolution according to user settings.

The display 207 displays a preview image received from the ISP 205. If there is an instruction of the controller 213, the display 207 displays the high-resolution image temporarily stored in the first buffer 209 instead of displaying the converted image received from the ISP 205. If there are one or more high-resolution images, they may be displayed on a screen of the display 207 together or selectively.

The first buffer 209 temporarily stores the high-resolution image received from the ISP 205, and may store one or more high-resolution images according to user settings or a size of a storage space. The first buffer 209 provides the temporarily stored one or more high-resolution images to the memory 211 according to an instruction of the controller 213. The memory 211 stores one or more high-resolution images received from the first buffer 209.

The controller 213 controls the ISP 205, the first buffer 209, and the driver 217. If an image capturing signal is received, the controller 213 provides a converted-image output interrupt signal to the ISP 205, and provides the first buffer 209 with a signal for outputting one or more high-resolution images temporarily stored in the first buffer 209 to the display 207. Upon receiving such a signal, the first buffer 209 provides the temporarily stored one or more high-resolution images to the memory 211 and stores therein. The temporarily stored one or more high-resolution images may be stored all in the memory 211, or may be selectively stored in the memory 211 according to user selection. One or more high-resolution images stored in the first buffer 209 may be displayed on the display 207 without conversion, but one or more high-resolution images may be delivered back to the ISP 205 and then displayed after they are converted into low-resolution images according to screen features of the display 207.

The key input unit 215 provides an image capturing signal to the controller 213 through an input means such as a button, and the driver 217 moves the lens system 201 according to control of the controller 213. Although not shown in the drawing, the key input unit 215 may include a motor for providing a driving force, and a carrier for moving the lens system 201 forward and backward by the driving force.

The ISP 205 may include a first converter (not shown) for converting the received image into a preview image, and a second converter (not shown) for generating image data from the received image at predetermined periods.

The memory 211 is a nonvolatile memory, and may be an external memory.

Figure 3:
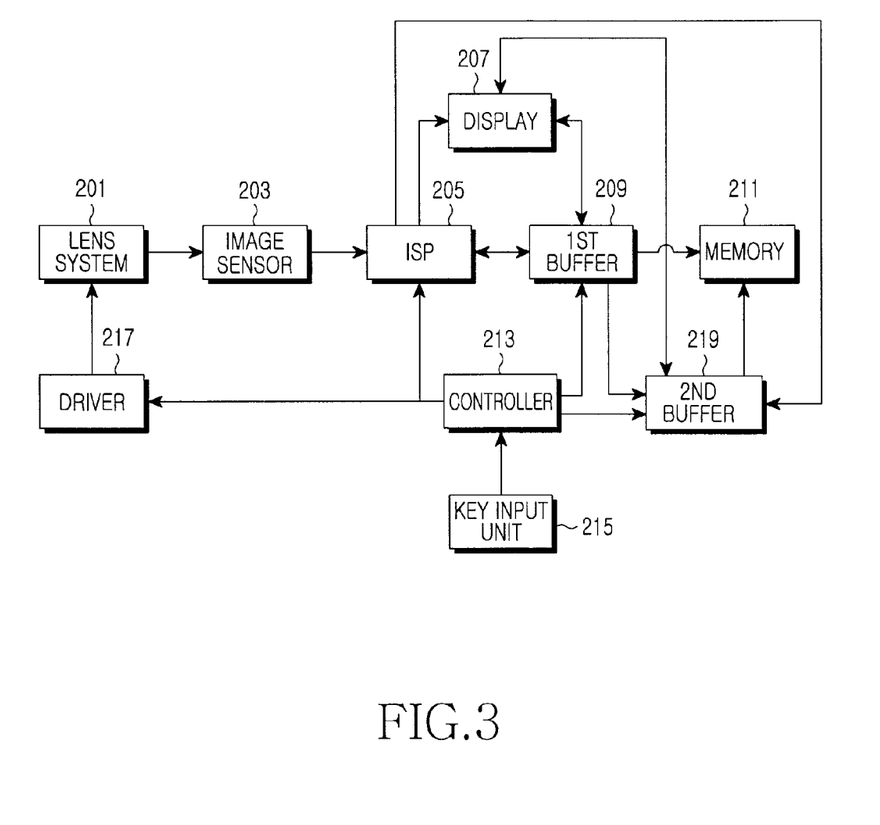
FIG. 3 is a diagram showing an internal structure of a camera using images stored in a plurality of buffers according to an embodiment of the present invention.

FIG. 3 shows an internal structure of a camera using images stored in a plurality of buffers according to an embodiment of the present invention. The internal structure of the camera shown in FIG. 3 further includes a second buffer 219 in addition to the elements of the camera shown in FIG. 2.

Referring to FIG. 3, the lens system 201 optically receives an image of a subject, and includes at least one lens. The image sensor 203 converts the image of a subject optically received by the lens system 201 into an electrical signal. The ISP 205 processes the electrical signal received from the image sensor 203 on a frame-by-frame basis, and outputs a preview image that is converted into a low-resolution image according to screen features (size, picture quality, resolution, etc.) of the display 207. The ISP 205 generates high-resolution images at predetermined periods and provides the high-resolution images to the first buffer 209. That is, the ISP 205 generates an image corresponding to a predetermined period among received images, as a high-resolution image, and temporarily stores the high-resolution image in the first buffer 209. The low-resolution preview image displayed on the display 207 in real time and the high-resolution image stored in the first buffer 209 may vary in size, picture quality and resolution according to user settings.

The display 207 displays the preview image received from the ISP 205. If there is an instruction of the controller 213, the display 207 displays the high-resolution image temporarily stored in the first buffer 209 instead of displaying the converted image received from the ISP 205. If there are one or more high-resolution images, they may be displayed on the display 207 together or selectively.

The first buffer 209 temporarily stores the high-resolution image received from the ISP 205, and provides the temporarily stored high-resolution image to the memory 211 according to an instruction of the controller 213. The memory 211 stores the high-resolution image received from the first buffer 209. If a new high-resolution image is stored in the first buffer 209, the second buffer 219 stores a high-resolution image generated in the next period. If a high-resolution image is stored in the second buffer 219, the high-resolution image stored in the first buffer 209 is deleted. Thereafter, a high-resolution image generated in the next period is stored in the first buffer 209. If the high-resolution image is stored in the first buffer 209, the high-resolution image stored in the second buffer 219 is deleted. That is, if a new high-resolution image is received and temporarily stored, each of the first buffer 209 and the second buffer 219 delivers or deletes the high-resolution image stored in the opposite buffer.

The controller 213 controls the ISP 205, the first buffer 209 and the driver 217. If an image capturing signal is received, the controller 213 provides a converted-image output interrupt signal to the ISP 205, and provides the first buffer 209 with a signal for outputting one or more high-resolution images temporarily stored in the first buffer 209 to the display 207. Upon receiving such a signal, the first buffer 209 delivers the temporarily stored one or more high-resolution images to the memory 211 and stores therein. The temporarily stored one or more high-resolution images may be stored all in the memory 211, or may be selectively stored in the memory 211 according to user selection. One or more high-resolution images stored in the first buffer 209 may be displayed on the display 207 without conversion, but one or more high-resolution images may be delivered back to the ISP 205 and the displayed after they are converted into low-resolution images according to screen features of the display 207.

The key input unit 215 provides an image capturing signal to the controller 213 through an input means such as a button, and the driver 217 moves the lens system 201 according to control of the controller 213. Although not shown in the drawing, the key input unit 215 may include a motor for providing a driving force, and a carrier for moving the lens system 201 forward and backward by the driving force.

While the number of buffers is limited to two in the drawing, the number of buffers may increase according to user settings.

A process of capturing an image of a subject using the elements of the cameras shown in FIGS. 2 and 3 will be described below.

Figure 4A:
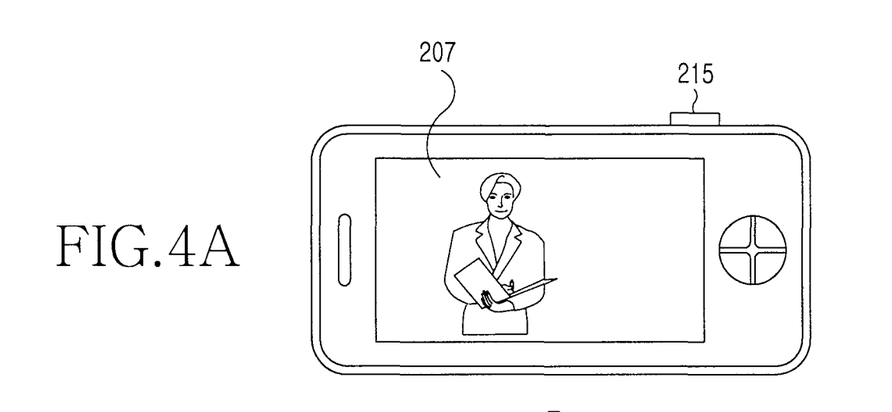
FIGS. 4A and 4B are diagrams showing a process of taking a picture using a subject's image stored in a buffer according to an embodiment of the present invention.
Figure 4B:
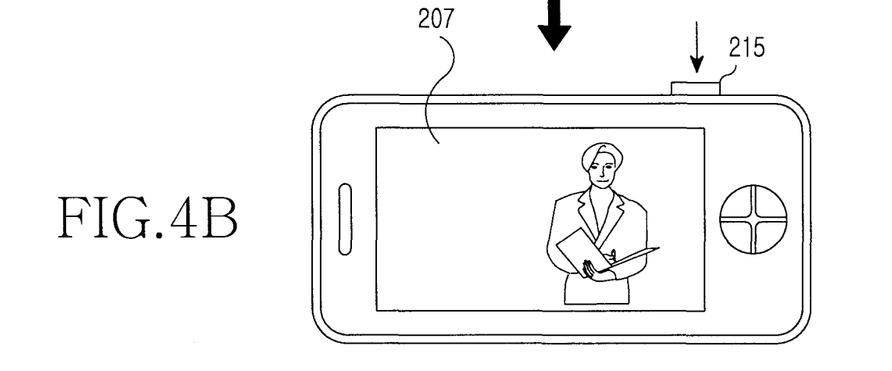

FIGS. 4A and 4B show a process of taking a picture using a subject's image stored in a first buffer according to an embodiment of the present invention.

FIG. 4A shows a scene where a preview image is received, in which a preview image corresponding to an image of a subject is output on the display 207 in real time using the lens system 201 of the camera. Since the preview image output on the display 207 is not a high-resolution image desired by the user, a low-resolution image converted according to screen features (size, picture quality, resolution, etc.) of the display 207 is output. Meanwhile, while the preview image is being output on the display 207, high-resolution images are generated and temporarily stored in the first buffer 209 at predetermined periods. The temporarily stored high-resolution images may vary in picture quality and size according to user settings, and the number of the temporarily stored high-resolution images may be subject to change according to a size of a storage space in the first buffer 209 where the high-resolution images are temporarily stored.

In the case where two buffers are provided as shown in FIG. 3, the second buffer 219 deletes the previously stored high-resolution image if a new high-resolution image is stored in the first buffer 209. Thereafter, if a high-resolution image generated in the next period is stored in the second buffer 219, the first buffer 209 deletes the previously stored high-resolution image.

FIG. 4B shows a result after an image capturing signal is input by an input means such as a button. If an image capturing signal is received from the user, the controller 213 provides a converted-preview image output interrupt signal to the ISP 205. Upon receiving the interrupt signal, the ISP 205 no longer delivers the converted preview image to the display 207. After that, the controller 213 provides the first buffer 209 with a control signal for outputting one or more high-resolution images temporarily stored in the first buffer 209 on the display 207. Upon receiving this signal, the first buffer 209 stores one or more images displayed on the display 207 in the memory 211, and displays the temporarily stored one or more high-resolution images on the display 207.

The controller 213 may select a user-desired image from among the one or more high-resolution images displayed on the display 207 before storing one or more images displayed on the display 207 in the memory 211 according to user settings, and may store only the selected image in the memory 211. Although not shown in the drawing, the controller 213 may directly display one or more high-resolution images stored in the first buffer 209 on the display 207 without conversion, or may display one or more high-resolution images after delivering the high-resolution images to the ISP 205 and converting them into low-resolution images according to screen features of the display 207.

Figure 5:
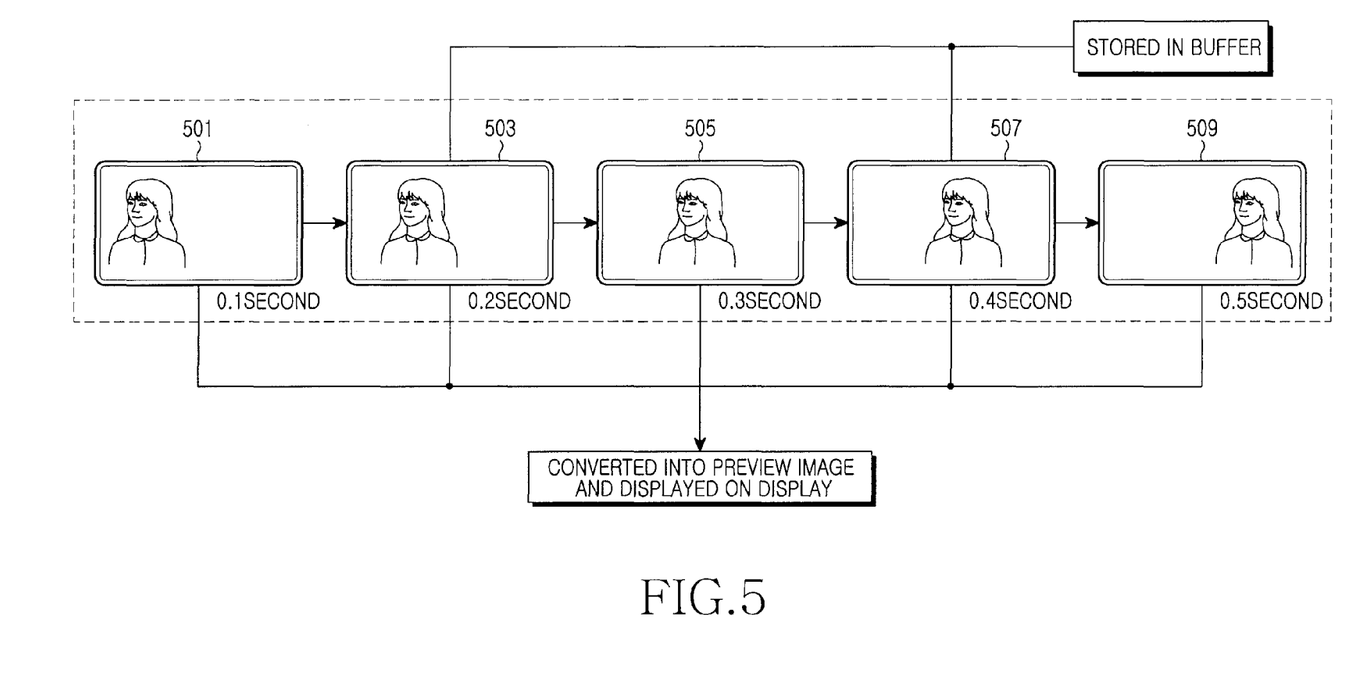
FIG. 5 is a diagram showing a process of extracting a high-resolution image from among images received at different times according to an embodiment of the present invention.

FIG. 5 shows a process of extracting a high-resolution image from among images received in different periods according to an embodiment of the present invention. It is assumed in FIG. 5 that an image of a subject is received through the lens system 201 of the camera once every 0.1 second.

Referring to FIG. 5, one or more images 501 to 509 are sequentially received through the lens system 201 of the camera. The received one or more images 501 to 509 are all sequentially converted into low-resolution preview images according to screen features of the display 207 in the ISP 205 and then displayed on the display 207.

The ISP 205 generates high-resolution images at predetermined periods, and stores them in the first buffer 209. That is, an image 503 received at 0.2 second and an image 507 received at the ISP 205 at 0.4 second are converted into low-resolution preview images, and at the same time, high-resolution images are generated. The generated high-resolution images are temporarily stored in the first buffer 209. The number of temporarily stored high-resolution images is subject to change according to a temporary storage space of the first buffer 209. A new high-resolution image is temporarily stored as the newest high-resolution image and the previously stored high-resolution image is deleted at intervals of 0.2 second. In case of a camera with multiple buffers, the image 503 received at 0.2 second is first stored in the first buffer 209, and if the image 507 received at 0.4 second is stored later in the second buffer 219, the first buffer 209 deletes the image stored at 0.2 second. Thereafter, an image received at 0.6 second is stored in the first buffer 209 and then the image stored in the second buffer 219 is deleted. As described above, the number of buffers is subject to change according to user settings.

Figure 6:
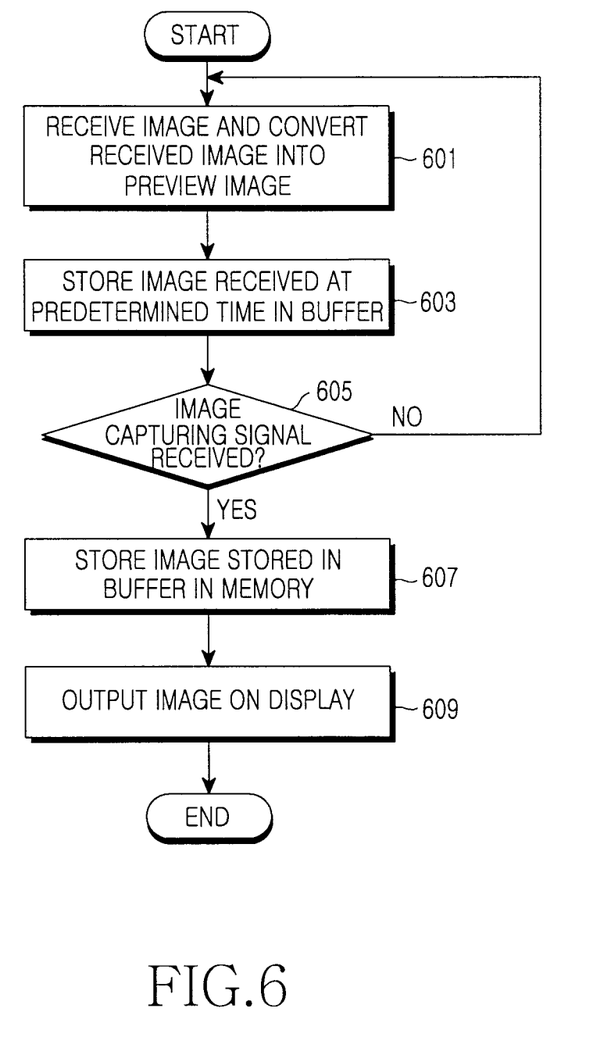
FIG. 6 is a flowchart showing a process of taking a picture using an image stored in a buffer according to an embodiment of the present invention.

FIG. 6 shows a process of taking a picture using an image stored in a first buffer according to an embodiment of the present invention.

Referring to FIG. 6, an image is received through the lens system 201 in step 601. The image is received at the ISP 205 through the image sensor 203, and converted into a low-resolution preview image by the ISP 205. That is, the ISP 205 converts the received image into a low-resolution preview image according to screen features of the display 207, and delivers the low-resolution preview image to the display 207. The display 207 displays in real time the low-resolution preview image converted according to its screen features.

In step 603, the ISP 205 generates images at predetermined periods, and temporarily stores them in the first buffer 209. The image temporarily stored in the first buffer 209 is a high-resolution image, and one or more high-resolution images may be stored according to a size of a storage space in the first buffer 209. Since new high-resolution images should be sequentially stored with the passage of time, a new high-resolution image is stored in an empty space occurring after the first stored high-resolution image is deleted, in order to secure a storage space, thereby updating high-resolution images in real time.

In step 605, the controller 213 of the camera determines whether an image capturing signal is received. The image capturing signal is received through the key input unit 215. If no image capturing signal is received, the controller 213 returns to step 601 and repeats the process of converting the image received through the lens system 201 into a preview image. If an image capturing signal is received, the first buffer 209 stores the temporarily stored high-resolution image in the memory 211 according to control of the controller 213 in step 607. Thereafter, in step 609, the temporarily stored high-resolution image is output on the display 207.

If the number of high-resolution images temporarily stored in the first buffer 209 is one or more, one or more high-resolution images are first displayed on the display 207 so that the user may store only desired high-resolution images in the memory 211. The one or more high-resolution images temporarily stored in the first buffer 209 may be displayed on the display 207 after they are delivered back to the ISP 205 and then converted into low-resolution images according to screen features of the display 207.

In case of a camera with the first buffer 209 and the second buffer 219, if a new high-resolution image is stored in the first buffer 209 and then a high-resolution image generated in the next period is stored in the second buffer 219, the first buffer 209 deletes the previously stored high-resolution. If a high-resolution image is stored in the first buffer 209 in a period following the next period, the high-resolution image stored in the second buffer 219 is deleted.

As is apparent from the foregoing description, exemplary embodiments of the present invention display one or more high-resolution images temporarily stored in the first buffer on a display in various manners so that a user may select only desired images and store only the selected images in a memory separately, thereby securing a storage space.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   a first memory;
   a second memory;
   an image sensor; and
   a controller configured to:
   obtain, using the image sensor, at a first time point, a first image corresponding to at least one object in a first resolution;
   buffer the fist image by storing, in the first memory, the first image at least temporarily in the first resolution, and display, via a display operatively coupled with the controller, the first image in a second resolution;
   obtain, using the image sensor, at a second time point, a second image corresponding to the at least one object in the first resolution;
   display, via the display, the second image in the second resolution without buffering the second image; and
   store, in the second memory, the first image stored in the first memory, in response to an input received in relation with the second image as displayed via the display.

2. The apparatus of claim 1, wherein the first memory comprises at least one buffer.

3. The apparatus of claim 1, wherein the controller is further configured to:
   select the first image from the plurality of images based at least in part on a specified period of time.

4. The apparatus of claim 3, wherein the controller is further configured to:
   obtain the plurality of images based at least in part on another specified period of time shorter than the specified period of time.

5. The apparatus of claim 1, wherein the controller is further configured to:

determine the second resolution based at least in part on a size of the display, a resolution of the display, a quality of an image displayed via the display, or any combination thereof.

6. The apparatus of claim 1, wherein the controller is further configured to:
adjust the first resolution of the first image into a third resolution prior to the storing of the first image in the first memory.

7. The apparatus of claim 6, wherein the controller is further configured to:
select a resolution higher than the first resolution as the third resolution.

8. The apparatus of claim 1, wherein the controller is further configured to
display, via the display, at least one image stored in the first memory including the first image in response to the input;
receive another input to select the first image of the at least one image; and
perform the storing of the first image in the second memory in response to the another input.

9. The apparatus of claim 1, wherein the controller is configured to:
replace the second image displayed via the display with the first image based at least in part on the storage the first image in the second memory.

10. A method comprising:
obtaining, at an electronic device including an image sensor and first memory, at a first time point, a first image corresponding to at least one object in a first resolution using the image sensor;
buffering the first image by storing, in the first memory, the first image at least temporarily in the first resolution, and displaying, via a display operatively coupled with this the electronic device, the first image in a second resolution;
obtaining, using the image sensor, at a second time, point, a second image corresponding to the at least one object in the first resolution;
displaying, via the display, the second image in the second resolution without buffering the second image; and
storing, in second memory operatively coupled with the electronic device, the first image stored in the first memory, in response to an input to capture an image.

11. The method of claim 10, wherein obtaining the plurality of images comprises:
selecting the second image from the plurality of images base at least in part on a specified period of time.

12. The method of claim 11, wherein storing the first image in the first memory comprises:
selecting the first image from the plurality of images based at least in part on another specified period of time.

13. The method of claim 10, wherein the first image corresponds to a first time, and the second image corresponds to a second time later than the first time.

14. The method of claim 10 wherein the first image corresponds to a first time, and the second image corresponds to a second time earlier than the first time.

15. The method of claim 10, wherein displaying the second image in the second resolution comprises:
identifying a resolution lower than the first resolution as the second resolution.

16. The method of claim 10, wherein displaying the image in the second resolution comprises:
determining the second resolution based at least in part on a size of the display, a resolution of the display, a quality of an image displayed via the display, or any combination thereof.

17. The method of claim 10, wherein storing the first image in the second memory comprises:
displaying, via the display, at least one image stored in the first memory including the first image;
receiving another input corresponding to the first image of the at least one image; and
performing the storing of the first image in the second memory in response to the another input.

18. The method of claim 10, further comprising:
replacing the second image displayed via the display with the first image based at least in part on the storage of the first image in the second memory.

19. A non-transitory machine-readable storage device storing instructions that, when executed by at least one processor, cause the at least one processor to perform operations comprising:
obtaining, at an electronic device including an image sensor and first memory, at a first time point, a first image corresponding to at least one object in a first resolution using the image sensor;
buffering the first image by storing, in the first memory, the first image at least temporarily in the first resolution, and displaying, via a display operatively coupled with the electronic device, the first image in a second resolution;
obtaining, using the image sensor, at a second time, point, a second image corresponding to the at least one object in the first resolution;
displaying, via the display, the second image in the second resolution without buffering the second image; and
storing, in second memory operatively coupled with the electronic device, the first image stored in the first memory, in response to an input to capture an image.

20. The machine-readable storage device of claim 19, wherein the operations further comprise:
replacing the second image displayed via the display with the first image based at least in part on the input.

* * * * *